(12) United States Patent
Panas

(10) Patent No.: US 11,585,933 B2
(45) Date of Patent: Feb. 21, 2023

(54) SYSTEM AND METHOD FOR ADAPTIVE OBJECT-ORIENTED SENSOR FUSION FOR ENVIRONMENTAL MAPPING

(71) Applicant: Lawrence Livermore National Security, LLC, Livermore, CA (US)

(72) Inventor: Robert Matthew Panas, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 657 days.

(21) Appl. No.: 16/561,787

(22) Filed: Sep. 5, 2019

(65) Prior Publication Data

US 2020/0132845 A1 Apr. 30, 2020

Related U.S. Application Data

(60) Provisional application No. 62/752,107, filed on Oct. 29, 2018.

(51) Int. Cl.
*G01S 17/89* (2020.01)
*G01S 7/48* (2006.01)
(Continued)

(52) U.S. Cl.
CPC .......... *G01S 17/89* (2013.01); *G01S 7/4802* (2013.01); *G01S 7/4808* (2013.01);
(Continued)

(58) Field of Classification Search
CPC ...... G01S 17/89; G01S 17/931; G01S 7/4802; G01S 7/4808; G06V 20/56; G06K 9/6288
See application file for complete search history.

(56) References Cited

U.S. PATENT DOCUMENTS

| | | | | |
|---|---|---|---|---|
| 5,235,316 A | * | 8/1993 | Qualizza | G01S 7/58 367/87 |
| 8,818,609 B1 | * | 8/2014 | Boyko | B60W 30/00 701/28 |

(Continued)

FOREIGN PATENT DOCUMENTS

JP 2017203766 A 11/2017

OTHER PUBLICATIONS

International Search Report and Written Opinion regarding International Application No. PCT/US2019/050390, dated Apr. 21, 2020.

*Primary Examiner* — Bryan Bui
(74) *Attorney, Agent, or Firm* — Harness, Dickey & Pierce, P.L.C.

(57) ABSTRACT

The present disclosure relates to a mapping system adapted for detecting objects in an environmental scene, by scanning an environmental scene with propagating energy, and receiving reflected energy back from objects present in the environmental scene, in a prioritized manner, for later use. The system may comprise an imaging subsystem which includes a detection and ranging subsystem for initially identifying primitive objects in the environmental scene. The imaging subsystem may also include an identification and mapping subsystem for prioritizing the primitive objects for further scanning and analysis, to ultimately identify one or more of the primitive objects as one or more abstract objects. An environmental model, updated in real time, is used to maintain a map of the primitive objects and the known abstract objects within the environmental scene, as new primitive objects and new abstract objects are obtained with repeated scans of the environmental scene.

21 Claims, 6 Drawing Sheets

(51) Int. Cl.
*G06K 9/62* (2022.01)
*G01S 17/931* (2020.01)
*G06V 20/56* (2022.01)

(52) U.S. Cl.
CPC .......... *G01S 17/931* (2020.01); *G06K 9/6288* (2013.01); *G06V 20/56* (2022.01)

(56) References Cited

U.S. PATENT DOCUMENTS

| | | |
|---|---|---|
| 9,097,800 B1 | 8/2015 | Zhu |
| 2015/0153184 A1 | 6/2015 | Mudalige et al. |
| 2016/0231746 A1 | 8/2016 | Hazelton et al. |
| 2016/0292872 A1 | 10/2016 | Hammond et al. |
| 2017/0205873 A1 | 7/2017 | Shpunt et al. |
| 2017/0293810 A1 | 10/2017 | Allen et al. |

\* cited by examiner

SYSTEM AND METHOD FOR ADAPTIVE OBJECT-ORIENTED SENSOR FUSION FOR ENVIRONMENTAL MAPPING

CROSS-REFERENCE TO RELATED APPLICATIONS

This application claims the benefit of U.S. Provisional Application No. 62/752,107, filed on Oct. 29, 2018. The entire disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to environmental and object mapping systems used in connection with autonomous systems, and more particularly to a mapping system which is able to apply a multi-modal sensing approach to the environment which is able to use the gathered knowledge about the surrounding objects to adaptively maximize the value of the captured data.

BACKGROUND

This section provides background information related to the present disclosure which is not necessarily prior art.

Autonomous vehicles have an environmental mapping challenge, owing to the requirement placed on these vehicles to far out perform human drivers. To ensure widespread adoption, autonomous vehicles must be not only safer than those driven by human operators, but safer by orders of magnitude greater than those operated by humans. This is because drivers are often uncomfortable passing control of the vehicle from their hands to an autonomous navigation system, and are likely to be quick to assign blame in a crash to the autonomous navigation system. A small chance of operator error, when a human is driving a vehicle, is generally acknowledged by the driver, and by other vehicle operators, when any vehicle is being operated by a human driver. Generally speaking, human vehicle operators realize this small risk as an acceptable, unavoidable risk when operating a motor vehicle on public roads. A failure of a self-driving vehicle, is out of the hands of the driver and may still be perceived as negligence attributable to the vehicle operator, even though the vehicle operator was not piloting the vehicle when the accident occurred. This remains the case even if the self-driving vehicle is statistically far less likely to be the cause of an accident compared to a vehicle being operated by a human driver. Widespread adoption of autonomous vehicles therefore requires a thorough solution to the challenge of vehicle safety.

Near perfect safety can only be achieved through near perfect environmental awareness. Once the environmental map has been passed to an algorithm, it becomes possible to ensure the algorithm can be robustly tested and refined to find a safe outcome. But inaccurate measurement or assessment of the environment in the vicinity of the vehicle acts as an error on the input to the algorithm, which cannot be fixed algorithmically when determining the needed vehicle controls (i.e., steering, braking, acceleration, etc.).

Any failure in environmental mapping will exponentially decrease vehicular safety. Autonomous vehicles must possess outstanding sensory capabilities in order to meet the needs to mass market adoption of autonomous operation to the general public. Present sensing capabilities possess a range of advantages and drawbacks, meaning that no single technology has shown itself to be the single solution to the problem. Engineers and scientists working in this field have begun experimenting with multi-sensor data fusion to solve this challenge. See, for example, the iDAR technology developed by AEye, as well as US 2016/0231746 and U.S. Pat. No. 9,097,800. However, these attempts have not focused on how to structure the data capture process to build on the strengths of the various categories of sensing technologies. Rather, they largely overlay the sensors to essentially add maps to one another. These systems are not fully realizing the opportunity for the sensing system to adapt to the perceived environment.

SUMMARY

This section provides a general summary of the disclosure, and is not a comprehensive disclosure of its full scope or all of its features.

In one aspect the present disclosure relates to a mapping system adapted for detecting objects in an environmental scene, by scanning an environmental scene with propagating energy, and receiving reflected energy back from objects present in the environmental scene, in a prioritized manner, for later use. The system may comprise an imaging subsystem which includes a detection and ranging subsystem for initially identifying primitive objects in the environmental scene. The imaging subsystem may also include an identification and mapping subsystem for prioritizing the primitive objects for further scanning and analysis, to ultimately identify one or more of the primitive objects as one or more abstract objects, where the abstract objects are understood as known types of objects. The imaging subsystem may further include an environmental model responsive to the detection and ranging subsystem, and to the identification and mapping subsystem, which maintains a real time map of the one or more primitive objects and the one or more known abstract objects within the environmental scene, and which updates the real time map with new primitive objects and new abstract objects as repeated scans of the environmental scene are obtained.

In another aspect the present disclosure relates to a mapping system adapted for detecting objects in an environmental scene, in a prioritized manner, by scanning the environmental scene using propagated energy, and receiving reflected energy back from objects in the environmental scene. The system may comprise a detection and ranging subsystem for using the reflected energy to carry out a first phase operation of imaging the environmental scene at a first degree of granularity, and generating information which is indicative of a presence of one or more objects in the environmental scene. The system may also include an internal model having an image recognition algorithm that receives the information and uses the image recognition algorithm to initially identify a plurality of objects in the environmental scene, with at least one of the identified objects being a primitive object having insufficient detail to enable a positive identification of an exact type thereof. The internal model further creates an object priority list for prioritizing further scanning of the identified objects. An identification and intention mapping subsystem may be included which is configured to receive the object priority list, and to carry out a second phase operation using the detection and ranging system to perform one or more additional scans in accordance with the object priority list, and also to obtain additional information for each of the identified objects, in accordance with the object priority list, and to report the additional information to the internal model. The internal model is further configured to use the additional information to help positively identity the at least one of the primitive objects on the priority list, and to report the additional information to the internal model.

In still another aspect, the present disclosure relates to a method for detecting and mapping objects in an environmental scene, in a prioritized manner, using energy propagated into the environmental scene and reflected back from objects in the scene. The method may comprise carrying out a first phase operation of imaging the environmental scene, using reflected energy from the environmental scene, at a first degree of granularity and generating information which is indicative of a presence of a plurality of objects in the environmental scene. The method may further include using the information to identify a plurality of objects in the environmental scene, at least one of the identified objects being a primitive object for which insufficient information is present to make a determination as to what the at least one primitive object is. The method may further include creating an object priority list for the identified objects for further examination. The method may further include carrying out a second phase operation of further using propagated energy to again scan identified objects in the environmental scene, in accordance with the object priority list, and using additional reflected energy to obtain additional information for each of the identified objects in the environmental scene, in a prioritized manner.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings. In the drawings.

DETAILED DESCRIPTION

Example embodiments will now be described more fully with reference to the accompanying drawings.

The present disclosure relates to Lidar systems and methods which hierarchically structure a data capture and analysis process to mimic the image analysis and object identification process, and in doing so maximize the value of the data that is captured. More particularly, the Lidar systems and methods described herein are based around adapting the data capture process in a Lidar system to closely mimic the object-focused process by which the human eye and brain map the surrounding environment. For example, the eye is able to capture a low resolution image over a wide field of view, but reserves a high resolution section for areas of interest. The brain applies this high resolution sensor to identify sequentially more complex features, and continues to collect data until it can reach a level of abstraction sufficient to identity the objects in the image. The systems and methods of the present disclosure, in a similar manner, apply a "sensor fusion" technology/approach to initially capture low resolution environmental measurements over a wide field of view, but then make a value determination for where to apply the limited high resolution sensing. The image recognition algorithms used with the system and method of the present disclosure then inform the distribution of high resolution sensing resources to ensure that the image recognition algorithm being used with the system and method is provided with the data it needs to identify the objects. Once the objects are identified, the limited sensing resources are re-applied to objects of next (i.e., lesser) priority. This is in contrast to an image-based sensing approach, where the focus is on the repeat capture of consistent images regardless of what information is contained in the images, and without any adaptation based on the objects recognized in the data. The system and method of the present disclosure, in one implementation, uses an object oriented and informed mapping process. The system first separates the field of view into primitive objects, then begins to refine the data around the shapes and areas of interest to classify the primitive objects. Capturing the location, identity and intention (for instance, motion kinematics) of these objects is an important, abstracted goal of the sensing approach that the present system and method employs. The decision about how to distribute limited sensing resources is based on exploiting different sensing technology in each of the phases of measurement and is based around the identification of the discrete objects in the field of view rather than capturing an unbiased uniform image over the field of view.

Figure 1:
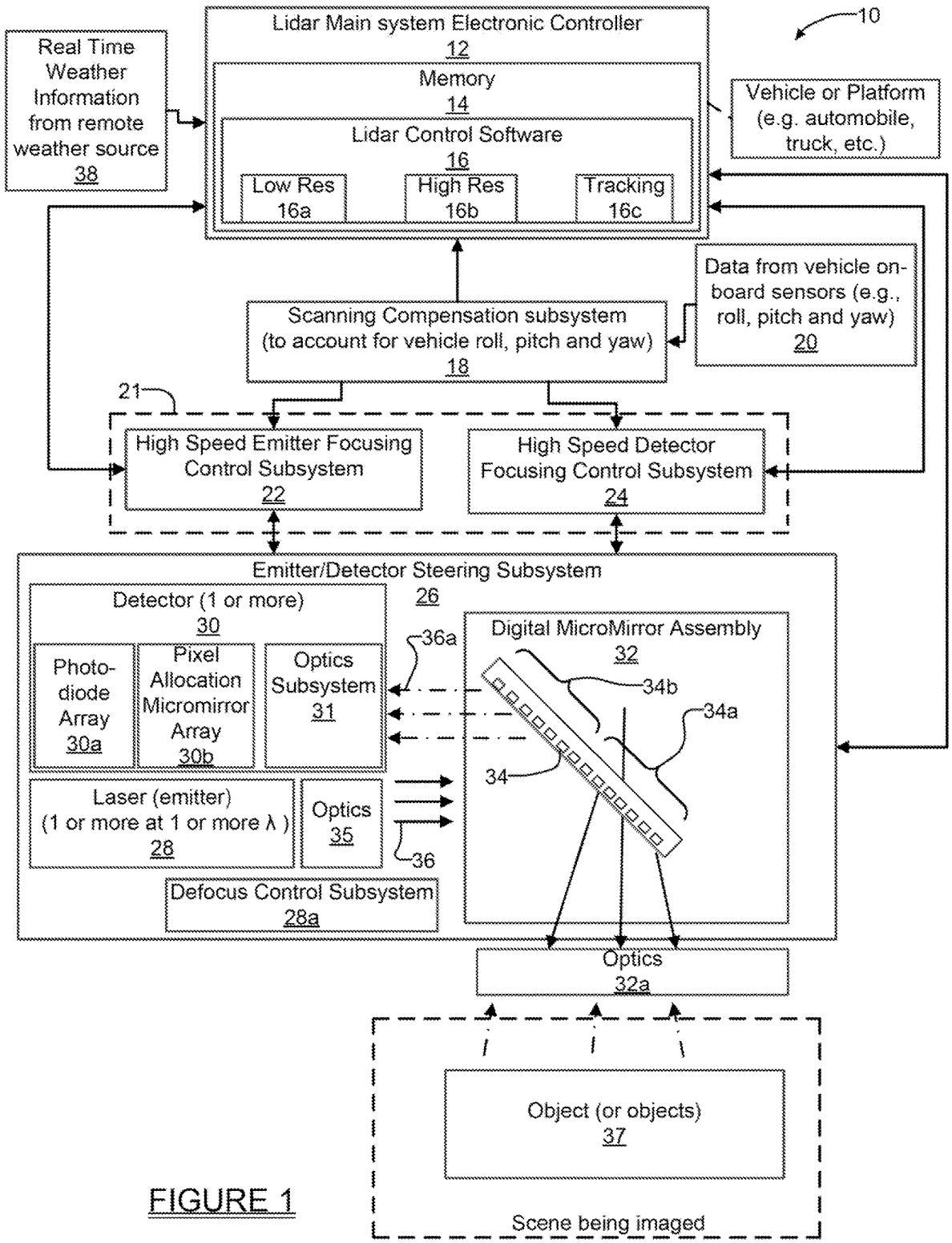
FIG. 1 is a high level block diagram of one embodiment of an adaptive Lidar system in accordance with the present disclosure.

Referring to FIG. 1, one embodiment of an adaptive Lidar system 10 is shown which may be used to implement the system and method of the present disclosure. In this example the system 10 may include a Lidar main system electronic controller 12 (hereinafter simply "controller" 12), having memory 14 included or accessible to it. The memory 14 may be a non-volatile memory such as, for example and without limitation, non-volatile RAM or ROM, and may contain Lidar control software 16 for helping to control aiming of a laser beam from the system as well as real time interpreting/detecting of objects within an imaged scene, and distances to such objects. The Lidar control software 16 may include a plurality of software submodules for implementing adaptive operating modes, for example a "low resolution" mode 16a, where repeated scans are made across an entire scene, a "high resolution" mode 16b where a selected subregion or object within the scene is focused on, and a "tracking mode" 16c where an stationary or moving object within the scene is tracked continuously for a given time. These modes 16a-16c may be used one at a time or in a multiplexed fashion in various combinations so that the system 10 can be best adapted to meet specific situations. These features will be explained in greater detail in the following paragraphs. However, it will be appreciated that the present system 10 and method is not limited only to modes 16a-16c, and that other modes, which may possibly even be different combinations of modes 16a-16c, are within the scope of the present disclosure.

The controller 12 may receive information from a scanning compensation subsystem 18 to account for vehicle movement, such as elevational position changes of the vehicle, roll, pitch, yaw, etc. The scanning compensation subsystem 18 generates the information from raw data received from vehicle on-board sensors 20 (e.g., gyroscope(s), roll sensor, pitch sensor, yaw sensor, etc.) that are commonly used on present day motor vehicles. Any sensing gaps (e.g. lack of gyros in a vehicle) in the vehicle on-board sensors can be supplemented with sensors included in the lidar system. And while the system 10 is expected to find particular utility in connection with motor vehicles such as passenger cars and trucks, as well as commercial trucks and delivery vehicles, the system 10 is also usable with a wide variety of other types of vehicles, for example marine vessels, aircraft, remotely controlled drones, and even earth moving equipment, off road vehicles (ATVs), and even railway vehicles (e.g., trains). In particular, the system 10 is expected to find significant utility in autonomous land, maritime and aviation vehicle applications.

The scanning compensation subsystem 18 communicates scanning compensation data to a high speed focusing control subsystem 21 which may include a high speed emitter focusing control subsystem 22 (hereinafter simply "emitter focusing subsystem" 22), as well as a high speed detector focusing electronic control subsystem 24 (hereinafter simply "detector focusing subsystem" 24). The emitter focusing subsystem 22 generates control signals. Emitter focusing subsystem 22 and detector focusing subsystem both communicate bidirectionally with an emitter/detector steering subsystem 26, which generates one or more laser beams at a scene or object being imaged and receives back reflected optical signals from one or more objects in the scene being imaged.

The emitter/detector steering subsystem 26 may include one or more lasers 28 and a detector 30 having a photodiode array 30a comprised of one or more light sensors, which in this example are in the form of photodiodes. For convenience, the laser 28 will be described as generating a single laser beam, although the present disclosure may just as readily be used with a plurality of independently controllable lasers that generate a corresponding plurality of laser beams. If a plurality of independently lasers are used, the beams may be of a common wavelength, or different wavelengths, each possibly selected based on providing optimal reflectance from specific types of objects (e.g., foliage, metal, plastic, human tissue, etc.). Both types of implementations are envisioned by the present disclosure.

The emitter/detector steering subsystem 26 may also include an optics subsystem 31, and a digital micromirror assembly 32. The digital micromirror assembly 32 may have a plurality of independently, digitally controllable micromirrors 34 which can be used to reflect the entire laser beam 36 generated by the laser 28, which passes through an optics subsystem 35 prior to reaching the micromirrors 34, through an optics subsystem 32a toward a scene being viewed. The digital micromirror assembly 32 also operates to reflect received light signals back to the detector 30 through the optics subsystem 31. In this regard, it will be appreciated that one group of the micromirrors 34, for example indicated by reference number 34a, functions as an "emitter array" to control the direction of emitted light from the laser 28 toward the scene being imaged laser, while a different group of the micromirrors 34, for example designated by reference number 34b, may function as a "detector array", which may be used to reflect received light signals into the detector 30. In one implementation the digital micromirror assembly 32 uses individual ones of the micromirrors 34 or subgroups of the micromirrors 34 to reflect different portions of the laser beam 36 (or even separate laser beams if more than two lasers are being used) toward two or more selected subregions of the scene being imaged, or toward two or more specific objects 37 in the scene, and to reflect received optical signals 36a from the two or more subregions and/or objects back into the detector 30. The digital micromirror assembly 32 thus makes it possible to closely image and/or track two or more subregions or objects within a given scene simultaneously in real time. An additional benefit of this high level of focusing ability provided by the digital micromirror assembly 32 is the ability to improve data collection in areas of value, providing data with much higher value than what would be collected from a single laser beam being raster scanned across an entire scene. This adaptive capability enables much more efficient use of the mechanical bandwidth available from the system 10 by examining data generated from specific selected portions or objects within a scene, rather than the entire scene. This important advantage will be described further in the following paragraphs.

The digital micromirror assembly 32 also collects reflected optical energy back from the scene being imaged, or from specific subregions or objects within the scene, and provides data corresponding to the received optical signal to the detector 30. Again, the detector 30 may be a single light detector or an array of independent light detectors, with one embodiment shown in FIG. 1 having the photodiode array 30a. The emitter/detector subsystem 26 reports the collected data back to the controller 12 which uses the lidar control software 16 to interpret the data and to decode and/or generate information on exactly what objects, and their respective distances from the vehicle, are present within the scene being imaged.

One possible configuration of the arrays 34a and 34b of the digital micromirror assembly 32 is rather to use a single array for both emission and detection steering, so they are using a common window. This requires a means to separate the returning light from the emitted light, which is done generally in one of two ways. In the first way, the apertures are of significantly different size, so one can form a small part of another while being co-aligned. For example, the laser beam 36 is reflected off a small mirror at the center of the collection aperture. Unfortunately, for MEMS, the aperture size is the major cost factor, and the performance scales by the product of the two apertures, emitter and receiver. So mismatching the size reduces performance while increasing cost. Matching the aperture sizes provides the highest return signal capture for the lowest cost. In the second way, a beam splitting optic is used to partially reflect some of the return beam to the detector. The ideal beam splitting value is generally roughly 50:50 splitting. Unfortunately, this attenuates the outgoing signal and the return signal, meaning approximately 4× the power is required. The increased power directly raises the cost of the emitter. From a practical view, the stray light from putting both onto a common array and having both go through a common window causes significant technical challenges. This is because even the fractional stray light returns from the shared optical path are often enough to swamp the detector reading, since it can be around six orders of magnitude lower than the emitted pulse. There will be windows, one on the mirror chip and one on the housing, and the external faces of the housing window will never be free of scattering objects. A separate window and optical path for emission vs detection avoids this signal cross-talk and lowers emitter power demands and sensor performance demands. The shared window can be implemented but another system using separated arrays/windows will win on cost hence margin, simplicity, manufacturability and performance. So while the present adaptive lidar system 10 may operate with a common array and window, one preferred layout is with separate arrays and windows.

The emitter and detection arrays 34a and 34b may have additional optical elements (31, 35, 32a) including lenses, angle magnification elements and area magnification elements placed before or after them. It is generally best practice to use a similar set of optics for both arrays, so they have matched optical capabilities (angular range, etc.) in order to do parallel tracking. For instance, angle magnifying lenses may be placed in front of both (32a) to increase the angular throw of the lidar system 10. This has the effect of increasing resolution and beam size on target, but the tradeoff may be worth it in many cases.

The system 10 provides the advantage that the light detecting sensor 30 may be operated in an adaptive mode by using different ones of the micromirrors 34 of emitter array 34a to control steering of the beam(s) from the laser beam 36 as well as to selectively direct different ones of the received (i.e., reflected) light signals back into the detector 30. In general, it would be desirable to match the array size of the micromirrors 34 used with the detector array 34b to the array size of the micromirrors 34 used with the emitter array 34a to emit the laser beam 36, so as to have a 1:1 mapping for laser 28 (i.e., the emitter) and the detector 30, but this is not strictly required. For example, the detector array 34b could be made larger than the emitter array 34a to capture more return light. The detector array 34b, or just a portion thereof, may then be steered to capture returns from any given area in the field-of-view, or possibly two or more given areas simultaneously. This ability to focus on a single spot will significantly reduce noise by rejecting light from all other directions but the small targeted field of view for each sensor of the detector 30. The detector 30 adaptively maps the incoming light 36a to a plurality of photodiodes within it by the use of a pixel allocation digital micromirror array 30b inside the detector 30. This process is described below. The detector array 34b could be slaved so that the detector array 34b effectively "tracks" the emitter array 34a, producing an optical imaging system that is both emitting to a particular direction and only sensing in that particular direction. The benefit of this configuration is significantly reducing interference in the detector 30, thus significantly improving the signal-to-noise ratio. It may be desired to slightly delay the pointing of the detector array 34b by the expected transit time of the light pulse, which can be around 1 μs for 200 m ranged targets. The delay ensures that when the pulse returns, the detector array 34b is directly facing that point rather than having moved on to point elsewhere. The alignment of the detector array 34b to the incoming pulse ensures the highest sensitivity to the return pulse. If higher sensing capability is desired for a particular beam, multiple detector array 34b micromirror elements could be pointed at the same angle to proportionally increase the captured signal. Likely, leaving each detector array 34b micromirror 34 steering element slaved to a corresponding emitter array 34a micromirror element will still provide good performance, as the increase in signal would also be generally accompanied by pointing more of the emitter array 34a micromirror elements 34 at the point of interest too. In general, the detector micromirror array 34b and the emitter micromirror array 34a act to bring a particular area of the field-of-view into regard by the lidar system 10, similar to a laser telescope and sensor telescope working in parallel to focus on a spot. The emitter/detector steering subsystem 26 then bounces a laser beam 36 off the object in that area, and gets a return signal 36a. By approximately slaving the detector 34b and emitter 34a micromirror arrays together, the system 10 is able to maximize the signal-to-noise ratio even if the beam is split and measurement is parallelized by scanning with multiple separate output beams. This is because the signal-to-noise is approximately driven by the product of the emitter area and the detector area, so the highest product for the least number of mirrors is to have the two aperture sizes equal. The acceptance angle of each detector array 34b micromirror element 34 could be made slightly wider than the expected emitter beam (i.e., beam 36) size so as to still capture the full emitted laser beam signal, even if the emitter array 34a and detector array 34b are slightly misaligned. This acceptance angle parameter would be largely constrained by the design of the detector 30, described below. However, the tradeoff is that the larger this acceptance angle is, the higher the background noise is likely to be.

Figure 3:
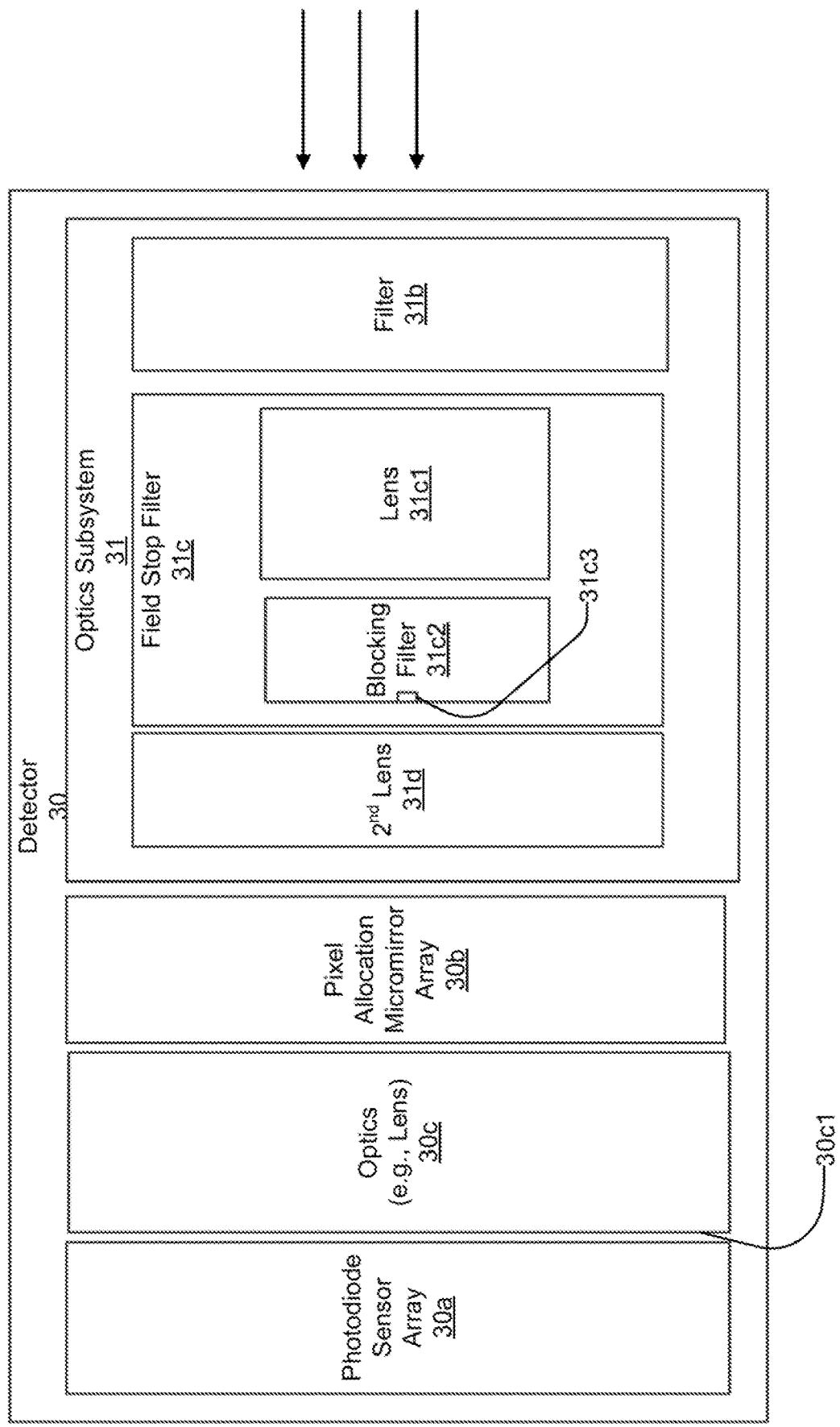
FIG. 3 is a high level block diagram of one example of a construction of the detector.

The detector 30 maps the light captured by the detector micromirror array 34b to the photodiodes of the photodiode sensor array 30a within it. It is often desired to use a small photodiode with the highest possible signal on it to improve signal collection capability. This requires that all light 36a being received from a specific pulse be focused down to a single area that may be smaller than the size of the steering mirrors in the digital detector micromirror array 34b. The size of the diode controls noise for some types of diodes (PIN), and the detector 30 response time, which is important for observing short nanosecond scale pulses characteristic of lidar returns. Each independent beam sent out by the lidar unit emitter/detector steering subsystem 26 will generate a return pulse, which will be captured by the corresponding slaved section of the detector micromirror array 34b, and all the return signal associated with that pulse should be focused to a single photodiode pixel (i.e., one of the photodiodes in the photodiode sensor array 30a in FIG. 1) if possible to minimize noise. However, minimizing noise presents two difficulties. First, the distribution of the detector micromirror array 34b area is adapting rapidly to capture the returns from one or more emitted beams so it cannot be predetermined. The layout of the light directing systems 31 and 30b within the detector 30 to focus the incoming light 36a to the photodiodes 30a must then also be adaptive. Second, there is an issue of environmental background noise including stray pulse returns from other nearby lidar units pulled in by the sensors. It is desired that the detector sensors (i.e., photodiodes of the photodiode sensor array 30a) only receive light from each mirror in the detector array 34b corresponding to the direction of interest that the mirror is pointing. However, mirrors will also pass light into the system from all other angles, which can get read in to the photodiodes 30a of the photodiode sensor array 30a causing environmental noise, if not filtered out. This is a particular issue with solar reflection or sensor crosstalk if other lidar units are operational in the area, as would be expected for self-driving cars operating in near vicinity to one another. The desired return pulse light is all leaving the emitter/detector steering subsystem 26 detector micromirror array 34b as a parallel set of beams 36a, while the unwanted light will be reflected off the mirrors at non-zero angles corresponding to other locations in the field of view. There is therefore a need to filter this off-axis light for both the wavelengths of interest and to remove the unwanted environmental noise returns. The design in FIG. 3 shows one way both of these goals may be accomplished. The signal 36a from the digital micromirror assembly 32 is fed into the detector 30. First, the light is filtered by a filter 31b to reduce returns corresponding to wavelengths other than the wavelengths used by the lidar system 10. Second, a standard field stop filter 31c is used to block the angular component of the captured light. This can work by using a lens 31c1 to focus the light to an image plane. A blocking filter 31c2 is placed on the image plane, and a small hole 31c3 is cut in the filter corresponding to the point at which the desired light signal 36a will focus. The hole 31c3 may be made in several ways including through solid material or with a silvering on the surface of a transparent plate. In the case of the reflective surface coating, the edges of the hole 31c3 could be made partially transmissive, which would allow slightly misaligned light to pass through, attenuated. The partial attenuation would help the detector array align to the emitter array, as compared to a binary mask. All light leaving the detector micromirror array 34b at undesired angles will get mapped to other locations on the focal plane, and be blocked by the filter 31c2. A second lens 31d returns the light back to a roughly collimated beam, which is pointed at the internal pixel allocation micromirror array 30b. The lenses may additionally be used in a standard image transfer setup where the detector micromirror array 34b is considered the input image plane. The lenses would then pass the image through the pinhole filter 30c2 and reimage it to the pixel allocation micromirror array 30b. This is often done with a 4-f optical setup, which does not magnify the image. While the pixel allocation micromirror array 30b does not need to be the same array size as the detector micromirror array 34b, it is generally best practice and the most flexible layout to make them equal. Then each mirror on the detector micromirror array 34b is mapped to a mirror on the pixel allocation micromirror array 30b. The pixel allocation micromirror array 30b takes the collimated light incident on it and distributes that light to the array of photodiodes of the photodiode sensor array 30a, which record the light pulse. The distribution process is carried out by steering the light through a lens 30c which maps angle to displacement of the focal point on the image plane. In this example the detector sensor array 34b is located on the image plane 30c1 of the lens 30c, so as the mirrors on the pixel allocation micromirror array 30b change the emitted angle of the light, that light focuses down to a different spot on the photodiode sensor array 30a. The benefit of using the lens 30c is that the focal point on the photodiode sensor array 30a is much smaller than the beam size at the pixel allocation micromirror array 30b. This allows for smaller detector sensor pixels to be used, which reduces sensing noise and reduces sensor response time. Each emitted beam 36 will generally have one pixel used to capture the return pulse 36a to minimize noise, so the photodiode array 30a is sized largely by the expected degree of parallelization. It is expected that a small array of <10 photodiodes are generally sufficient.

The system 10 provides a fully adaptive lidar system having the ability to switch between different sensing modes as needed, and as controlled by one or more algorithms included in the lidar control software 16. The lidar control software 16, in connection with the controller 12, may determine how to split up the emitter array 34a and detector array 34b pointing capabilities between a plurality of different possible modes, those being, for example, the low resolution mode implemented by low resolution subsystem 16a, the high resolution scanning subsystem 16b and the tracking mode subsystem 16c. As noted above, multiple modes may be simultaneously driven by different sections of the arrays 34a and 34b, or the arrays might be used sequentially, where the entirety of each array 34a and 34b is dedicated to one mode of operation at a time.

The system 10 also compensates for, and cancels out, platform motion of the platform (e.g., vehicle) which it is being used with. By this it is meant that the system 10 can be controlled such that the pointing angle assigned to the emitter array 34a accounts for and cancels out motions of the platform, such that the laser default pointing angle remains largely constant as seen in the frame of view of the environment around the platform during the time of the scan. The compensation ensures that the point cloud data collected by the lidar unit is not distorted by sudden mid-scan orientation changes in the platform. Such distortions map into the 3d point cloud data, distorting it and changing the shape, location or even existence of objects in the collected image. The angular distortion issue is amplified by range, and can significantly lower the quality of long range data. Compensation in data collection allows for crystal clear images despite vibration and jolting occurring on the platform, the platform is whether it is a drone, passenger automobile, truck, aircraft or even an individual. The compensation could be enabled during a particular step, for instance a high-resolution area scan, so that the vehicle maneuvering does not show up as a distortion in the point layout. One possible method of operation is to determine the expected vehicle orientation, then use accelerometer data, which may be included in the sensor data 20, to measure high frequency variation from that orientation, and send high frequency signals to the arrays 34a and 34b to cancel out the platform orientation variation, so the laser remains pointed in the desired direction in the global frame of reference. This would maintain the emitter and detector arrays 34a and 34b pointing the beam 36 along the desired nominal axis even during shocks or bumps, but would keep them in line with the vehicle during low frequency turns, as the low frequency variation is allowed to pass uncompensated. The goal is to produce an image of the surroundings as if the platform were stationary during the period of the scan. It is important that the lidar system 10 be able to maintain the orientation at the start of the measurement, then use this as the reference frame for orienting the image processing algorithms to the collected data. The adaptive compensation provided by the system 10 cancels out high frequency issues. The largest remaining error is the known vehicle motion. The known vehicle motion can be removed by adding a vector to each point in the point cloud returns that corresponds to (and removes) the vehicle's motion since the start of the scan up to the time of that particular point's collection. Most scans will generally be a fraction of a second (¹⁄₁₀ s), so the vehicle can generally be modeled as under relatively simple kinematics during that period. For instance, a uniform acceleration and initial velocity can be applied to clean up lidar images collected during a time period where the vehicle is braking. Between measurement steps, the compensation could be halted as required so the lidar pointing angle of the arrays 34a and 34b would be realigned with the nominal direction of the vehicle. Deliberate maneuvering of the vehicle could be passed to the scanning compensation system 18 to modulate the nominal axis, so the emitter and detector arrays 34a and 34b are always pointed towards the expected direction of travel of the vehicle without any low pass filter lag.

The system 10 provides a fully adaptive emission and detection system which can switch between modes as needed by the image lidar control software 16 working in connection with the controller 12. The lidar control software 16 and controller 12 may be used to determine how to split up the pointing capabilities of the digital micromirror assembly 32 between the different possible imaging modes. The system 10 may also operate in several modes, including, but not limited to, the low resolution scanning mode implemented by low resolution scanning subsystem 16a, the high resolution scanning mode implemented by high resolution scanning subsystem 16b, and the focused tracking mode implemented by tracking mode subsystem 16c. Multiple modes may be simultaneously driven by different sections of the emitter and detector arrays 34a and 34b, or the entire array formed by digital micromirror assembly 32 might be used sequentially, where the whole array is dedicated to one mode of operation at a time, and possibly then at some point in time, carrying out higher resolution scans, and/or enabling focused tracking on a single detected object in the scene being imaged.

Low Resolution Scanning Mode

The low resolution scanning mode implemented through the low resolution scanning subsystem 16a may provide "rough" detection of objects. The scans implemented in this mode of operation can be progressive, so over longer periods of time all of the space in a given imaged scene is covered. But on any given scan, the area covered by the scan may be laid out to allow for large gaps between the measured points. This provides a rough area measurement, checking for objects within the range of interest. The defocus control subsystem 26 may also adaptably defocus the laser beam 36 slightly during the low resolution scan operation, so the laser beam is likewise wider, ensuring that no objects can slip between low resolution scan grid points. Such defocus could be done with a high speed electronic focus control subsystem 28a, such as a liquid lens.

High Resolution Scanning Mode

The higher resolution mode implemented using the high resolution scanning subsystem 16b can be performed to cover areas of anticipated high value, identified either by their location in the field of view (such as the road directly ahead or around a turn for a car) or by previous scan data, which indicates a possible unexpected return. Such areas are identified by the lidar control software 16, then assigned a higher value by the software 16, and then passed to an active high mechanical bandwidth steering mirror or emitter/detector array combination (i.e., selected portions of arrays 34a and 34b) to do a focused study within. This acts similarly to the human eye, where the area of interest is studied with high resolution imaging, while low resolution image capture is used outside of this region to provide a means of determining where focus should next be applied. In this method, multiple areas of high value, or values of different scale could be applied, and the mirror controllable motion shifted between these areas to ensure coverage of the important areas. This would allow an unexpected return of a low resolution mapping effort to be quickly studied in high resolution detail, while the area all around is left at low resolution. The effect of such adaptability is to increase the quality of the incoming data, providing only information in areas of expected value, rather than a vast torrent of generally uninformative points of data.

Such adaptable scanning could may be carried over to a multi-wavelength mode, where different laser wavelengths in a single or set of emitter/detector devices are given a value map, for example assigned by the Lidar control software 16, for their respective fields of view. For instance, a laser which has high reflectivity off of vegetation (or specifically low reflectivity off vegetation to see through it) may be tasked with scanning the sides of the road ahead, but avoiding wasting time imaging the road directly ahead and below. This layout would be changed/controlled in accordance with direction of the road as the road turns. Likewise, a laser optimized for pavement or vehicle return would be tasked mainly with looking at the road ahead and below. Different wavelengths are known to work better or worse in different weather conditions, so the value map contained in the Lidar control software 16 may be adjusted as weather conditions change, for example based on real time weather data supplied from an external weather information source 38 as shown in FIG. 1. For example, during poor weather, the clear weather laser may be essentially drawn down to general low resolution mapping or even turned off, but the poor weather laser system scaled up to full bandwidth, full scale mapping. This would allow for the system 10 to trim out low quality data, reducing the data load on image processing algorithms used in the Lidar control software 16 and thus substantially improving the overall response rates for the subsystems 16a, 16b and 16c.

The mode of imaging can even be shifted to go from image generation to tracking via dithering, using the tracking mode subsystem 16c shown in FIG. 1, around a particular reflection in order to find the center of that return signal. This allows for very high bandwidth tracking of an individual object, such as the taillight of a car in the road ahead. The high bandwidth non-imaging operation may bypass the image processing algorithm portion of the lidar control software 16, and may do so with high resolution position information (due to the continuous lock-on), reducing the noise and latency of velocity or acceleration readings on the objects in the field of view. This capability is valuable for autonomous vehicles in emergency situations where events are occurring at high speed, and precise accelerations must be known to determine maneuvering plans.

Figure 2:
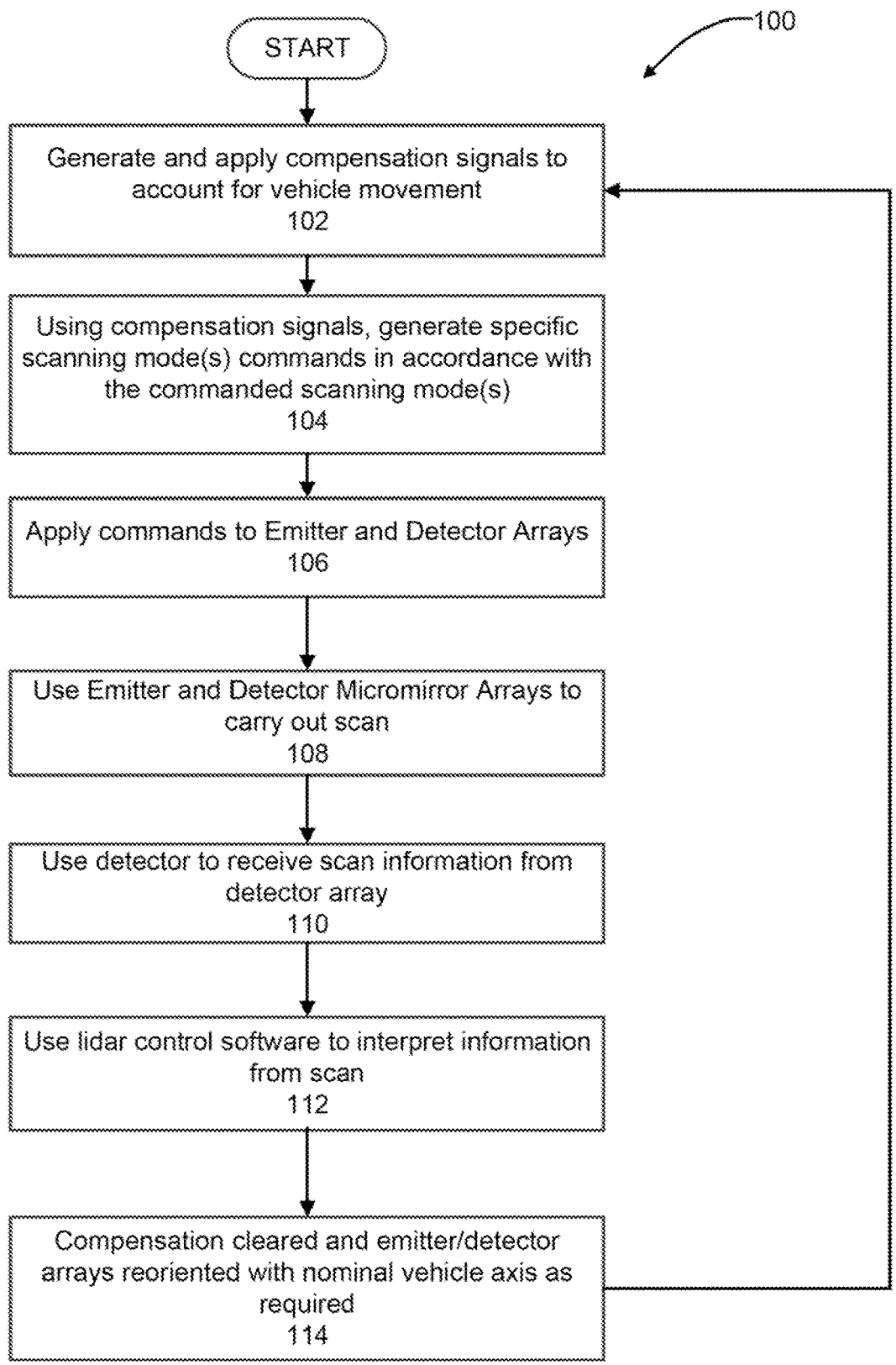
FIG. 2 is a high level flowchart setting forth a plurality of operations that may be performed by the system shown in FIG. 1.

Referring to FIG. 2, a high level flowchart 100 is shown illustrating basic operations that the system 10 may carry out in performing its various scanning modes. At operation 102 the compensation signals are fed into the controller 12 to account for movement/motion of the vehicle (i.e., brief sudden elevation changes, yaw, pitch, roll, etc.). At operation 104, using the compensation signals, the lidar control software 16 and the controller 12 generate specific scanning mode(s) commands in accordance with the commanded scanning mode(s). At operation 106, the scanning mode commands are transmitted to the emitter/detector subsystem 26. At operation 108 the emitter and detector arrays 34a and 34b are controlled to carry out commanded scanning operation. At operation 110 the detector 30 is used to receive the reflected optical signals from the detector array 34b. At this operation, preferably the internal pixel activation array may be modified to direct each of the independent returning signals to an independent sensing pixel within the detector 30.

At operation 112 the lidar control software 16 interprets the data received from the emitter/detector subsystem 26 for the just-completed scan. At operation 114 the compensation values may then be cleared, and the emitter and detector arrays 34a and 34b reoriented with the nominal vehicle axis as required, in preparation for the next commanded scan.

The various embodiments of the system 10 described herein thus provide a number of important advantages over previously developed lidar systems. A particularly important advantage of the system 10 is that the system 10 can be commanded to capture only data pertaining to specific subregions of a scene and/or specific detected objects within a scene, and the system 10 can be dynamically controlled in real time to adjust to imaging other subregions and/or objects. This can dramatically reduce the data required to be analyzed by the Lidar control software 16.

The system 10 provides the benefits of high resolution limited only by the scanning mirrors pointing stability (<0.001° or 20 ƒrad) mapping but without the data handling and bandwidth usage issues that otherwise rise with such high resolution scanning. The system 10 enables objects to be seen and detected well before previously developed lidar systems are able to due to the capability to provide extra measurements for increased range in certain areas, which enables the system 10 to detect vehicle tail-lights, and other relatively small yet highly important objects, which other sensors would have extreme difficulty detecting or simply be unable to detect in the short time needed for real world applications. This makes the system 10 especially adept at anticipating possibly rapidly developing and hazardous situations in real traffic/travel conditions.

The system 10 also provides range and rate adaptability advantages over previously developed lidar systems. The system 10 is able to focus one or more lasers to the same point for increased range, for example when dealing with dense weather making for limited visibility (e.g., drizzling rain and/or fog), or trying to locate a spurious signal, as well as averaging out multiple received signals for even finer detection resolution, or spreading emitted beams all around for even more rapid image generation that what would be possible with previously developed Lidar system.

The system 10 can dynamically adjust between longer distance, stronger beam (combined mirrors from the detector array 34b) or rapid imaging (split the emitted beams using the emitter array 34a) to adapt to vehicle requirements (weather, obstacles or other issues ahead in the projected path of travel). The system 10 can use its dithering subsystem 16d to dwell at specific selected points to capture even higher quality signal data for longer range if desired, with a tradeoff of data rate for quality.

The tracking mode subsystem 16c of the system 10 enables the system to obtain high density data focused continuously at an area ahead of the vehicle, even during turns, and automatically modifies the area of focus, such as up and down curved and/or undulating roads, where previously developed lidar systems would typically suffer significantly degraded (or possibly a total loss of) imaging capability. The system 10 further enables wide or detailed imaging, to produce a fine map of object for easy identification, find high reflectivity retroreflectors (e.g., taillights) for excellent real time distance measurements, even in poor visibility conditions. Advantageously, the system 10 is able to ignore areas of little interest, for example to take only limited or sparse readings (e.g., close to the vehicle at speeds, or possibly far to sides of the vehicle), in order to provide just enough imaging data to identify if an object of interest may exist in such locations, and then can initiate a more focused scan using its high resolution scanning subsystem 16b, or its tracking mode subsystem 16c, or other subsystems 16d for additional scan data if the system 10 chooses.

From a practical performance standpoint, the system 10 makes far more effective use of the obtained data, and a greater than 10× increase in the speed of object acquisition and assessment by the system 10 is possible. The system 10 further enables increased dynamical mode adaptability and the ability to generate 1d or 2d images as required by a given situation for the best tradeoff/balance between data quantity and collection time. The system 10 may further be used to shift imaging a single point in the scene, and held on target on the single point, for continuous clean reads, or possibly dithered back and forth over for clean, strong reading, which enables the system 10 to become a dedicated object channel for high resolution, real time distance measurements. This capability enables the system 10 to implement a single dedicated scanning channel per vehicle taillight, which can provide object orientation, velocity and acceleration, with no complex math being required for measurements. This helps the system 10 to operate with extremely low latency in certain conditions, which is highly valuable in critical situations, such as where another object or vehicle travelling ahead and being imaged by the system 10 makes a sudden braking action. The direct lock-on to another vehicle that would occur during tracking could be used to generate a free-space optical communications link, if the other vehicle has a similar system that is able to see the incident laser. The lidar system 10 would need to have the ability to use the laser as a communications link, which might be done by including a low cost, short range pulsed communications laser diode in the laser 28. For instance, it is expected that lidar units would go in or around the taillights, which make for excellent tracking targets. A vehicle approaching from the rear might switch to tracking as it gets close, lock in to a taillight, and send a warning signal to the vehicle ahead of it (through the taillight lidar unit) to try and accelerate to avoid collision. This ad-hoc network could be useful for cars to warn one another of impending collision.

Figure 4:
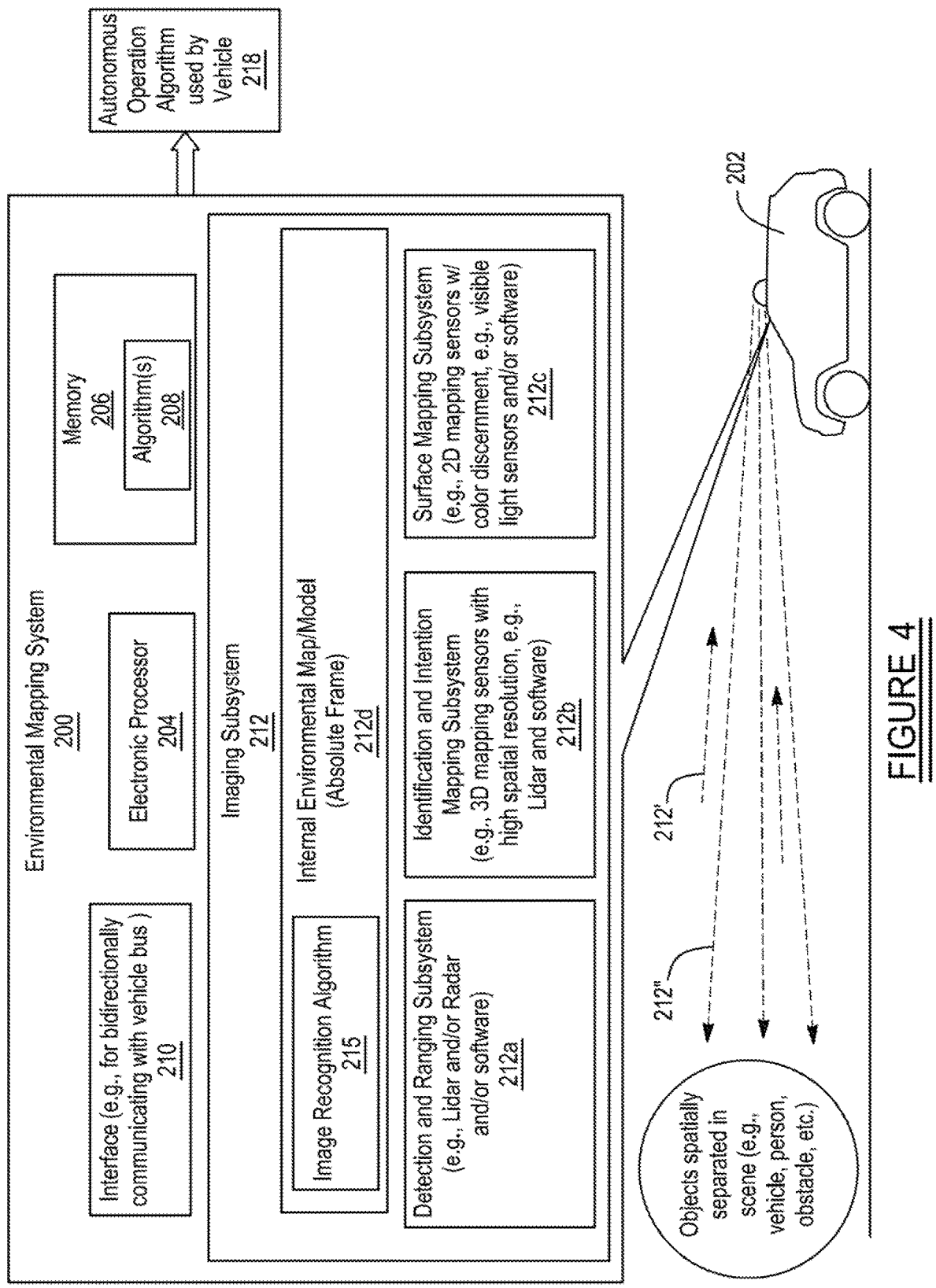
FIG. 4 is a high level block diagram of one example of a mapping system in accordance with the present disclosure.

With regard to FIG. 4, the Lidar control software 16 shown in FIG. 1 may be used in whole or in part to implement a multi-process, "sensor fusion" environmental mapping system 200 (hereinafter simply "mapping system 200"), in accordance with the present disclosure. FIG. 4 shows the mapping system 200 being used with a car 202, although it will be appreciated that the mapping system 200 is not limited to use with just automobiles such as cars, trucks, vans, SUVs, light pickups, etc., but rather may be used with virtually any type of vehicle such as drones, autonomous land vehicles used in mining, agriculture, earth moving, as well as fixed wing aircraft, and even marine vessels. Virtually any vehicle that is controlled in full or in part using an autonomous control system may make use of the system 200.

The mapping system 200 may incorporate a plurality of distinct operating phases, which may be performed continuously in real time, and simultaneously with one another. The operating phases may initially capture low resolution environmental measurements over a wide field of view, and follow this up with a value determination for where to apply limited high resolution sensing within the environmental scene being imaged. Image recognition algorithms used with the mapping system 200 then inform the distribution of high resolution sensing resources to ensure that the algorithms being used with the Lidar system 10 is/are provided with the data needed to more particularly identify the various objects in the scene. Once the objects are identified, the limited sensing resources are re-applied to objects of next (i.e., lesser) priority. This differs significantly from a conventional image-based sensing approach, which repeatedly captures images of a given environmental scene regardless of what information is contained in the images, and without any adaptation or "prioritization", or determination of relative importance of the various objects, objects recognized in the data.

The sensing returns from all phases are mapped to a non-moving frame of reference, which may be termed an "internal model", which is stored in the memory 14, and which corresponds to the surrounding environment. The spatial locations are gained via the ranging capability of the sensors used in the first phase, which can provide rough angular direction as well as distance to the object. The spatial locations are further refined by the second phase high resolution 3D object mapping capability. The surfaces measured in the third phase are applied to the previously identified surfaces of the 3D maps generated by the second phase measurement.

The eventual operation of the sensors and the image recognition algorithms result in an abstracted, object-oriented environmental map. The abstracted objects are objects that may have started out as primitive objects (i.e., not showing sufficient detail to make a definite determination as to exactly what they are), but through two or more repeated scanning operations, have been sufficiently updated with new information to form abstracted objects, where their identity is now known and classified. By "classified" it is meant that the abstracted objects now contain all necessary metadata (i.e., size, direction of movement, etc.) for the vehicle control algorithms to use them to determine paths. It is the abstracted object map that is passed to the vehicle's autonomous operation control software which determines how to steer, and/or accelerate, and/or brake the vehicle to safely navigate the abstracted objects in the field of view (i.e., the abstracted object map) being imaged.

The mapping system 200 achieves the foregoing by using an object oriented and informed mapping process. More particularly, the mapping system 200 first separates the field of view into primitive objects (objects for which insufficient information is currently available to identify exactly what they are), then begins to refine the data around the shapes and areas of interest to classify these abstracted objects (i.e., objects that can be definitively classified, for example as a bicycle, trash can, etc.). Capturing the location, identity and intention (for instance, motion kinematics) of the objects in a given field of view are important operations performed by the mapping system 200. The decision about how to distribute limited sensing resources is based on exploiting different sensing technology in each of the phases of measurement, and is based around the identification of the discrete objects in the field of view rather than capturing an unbiased uniform image over the field of view, with no assessment or prioritization of the significance or importance of the various objects present in the field of view.

FIG. 4 illustrates a high level representation of various subsystems that may be used to form the mapping subsystem 200. The mapping system 200 may include an electronic processor (e.g., computer) 204, a non-volatile memory 206 used to store one or more algorithms 208 as well as data collected by the system 200, and an interface 210 for communicating with a bus of the vehicle 202 (e.g., typically a CAN bus in automotive applications). The mapping system 200 may also include an imaging subsystem 212 which is controlled by the processor 204, and which uses the memory 206 to temporarily store data collected during use of the mapping system 200. The imaging subsystem in this example 212 includes a detection and ranging subsystem 212a, an identification and intention mapping subsystem 212b (hereinafter "IIM subsystem" 212b), and an optional surface mapping subsystem 212c. The detection and ranging subsystem 212a may be comprised of a Lidar subsystem, for example all or a portion of the system shown in FIG. 1, and/or radar, and/or suitable software. The surface mapping subsystem 212c may include one or more visible light sensors and/or software. The subsystems 212a, 212b and 212c obtain information from, and/or output information to, an internal environmental map or model 212d (hereinafter simply "internal model" 212d). The internal model 212d may include an image recognition algorithm 215 which helps to evaluate and identify specific objects detected within the environmental scene. The mapping system 200 may output real time data to the vehicle's autonomous operation algorithm 218 for use in controlling navigation of the vehicle 202. The operations of the subsystems 212a-212d may also be performed in real time, repeatedly, as will be described in greater detail in the following paragraphs.

Figure 5:
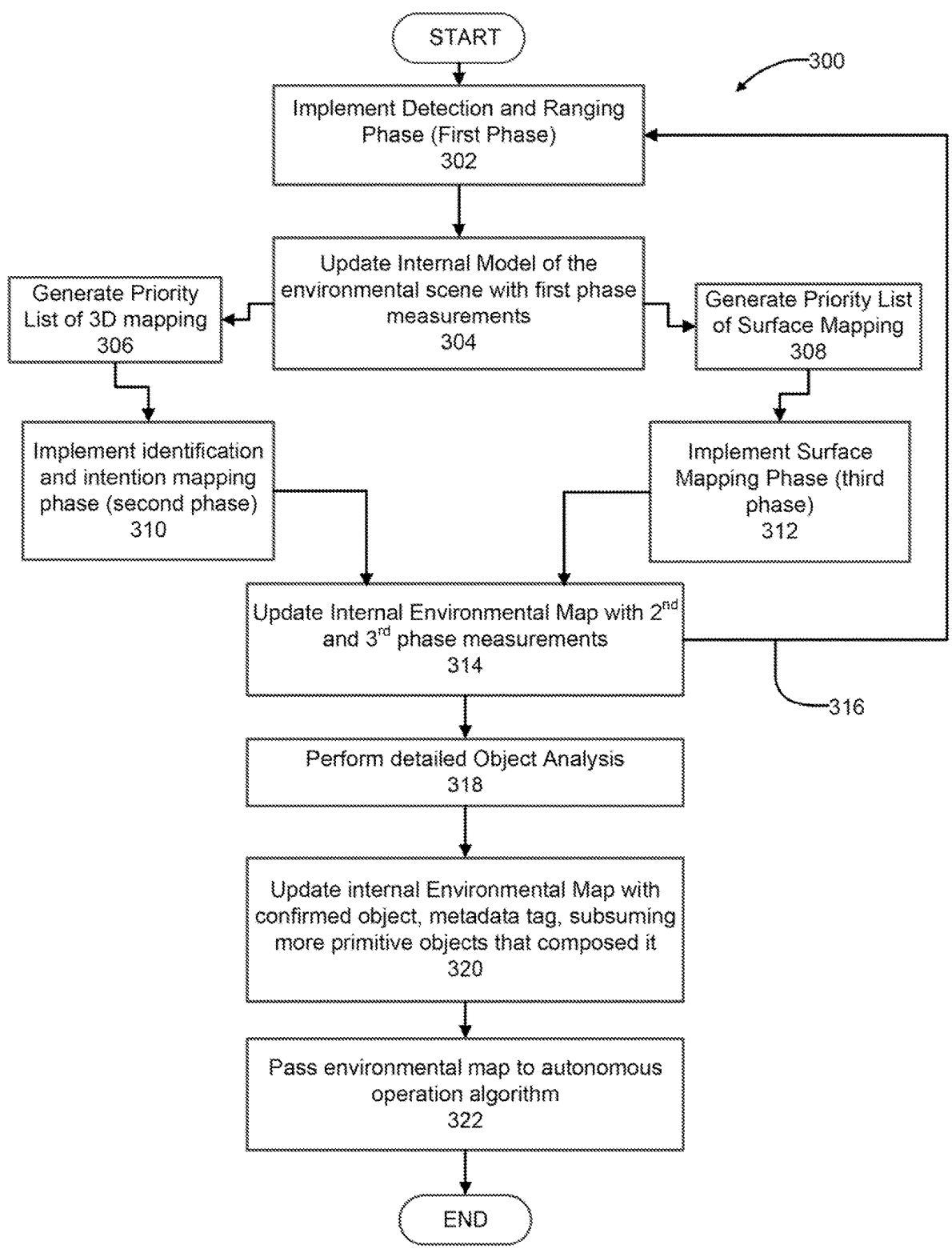
FIG. 5 is a high level flowchart of major operations that may be performed by the mapping system of FIG. 4.

Referring to FIG. 5, a flowchart 300 illustrates a plurality of high level operations performed by the system 200 in creating a highly detailed environmental map of a scene around a vehicle. The various operations discussed in connection with FIG. 5 will be discussed in significantly greater detail in FIG. 6, but the summary of major operations shown in FIG. 5 will help to provide a simplified overview of how the mapping system 200 is performing a plurality of operations in parallel to continuously refine the objects identified in the environmental scene and being added in the internal map 212d.

Initially at operation 302 of FIG. 5, a "detection and ranging phase", which may also be termed a "first phase", is performed to begin collecting data for use in constructing a "coarse" ranging map in the internal model 212d. This involves collecting data on primitive objects (sometimes referred to herein simply as "primitives"), which as noted above may be understood as possible objects of interest in the environmental scene being imaged, but for which insufficient data has been collected to make a determination as to exactly what the primitive object is, exactly where it is in the environmental scene, or its relevance compared to other primitive objects which have been collected. For example, a primitive object might be information that indicates that something is ahead in the path of the vehicle, but which is insufficient to identify if that "something" is a tree branch, a bicycle or a road construction barrel. At operation 304 the mapping system 200 updates the internal model 212d of the environmental scene with the first phase measurements. Operations 306 and 308 may then be performed in parallel. Operation 306 involves generating a priority list of objects, both primitive and abstract, for 3D mapping. Operation 308 involves generating a priority list that is to be used in applying surface mapping to the primitive objects. Operations 310 and 312 are also then performed in parallel, with operation 310 involving implementing an identification and intention mapping phase (i.e., the "second phase") using the priority list generated at operation 306, and operation 312 involving implementing surface mapping of the primitive objects using the priority list generated at operation 308. The identification and intention mapping phase 310 involves taking additional measurements (i.e., a second round of measurements) of specific objects identified in the scene (both primitive and abstract) to obtain a better understanding of what the object is and its possible importance/relevance in the environmental scene. The operations performed at operation 312 involve gathering a 2d image of specific objects identified in the scene in order to apply surface mapping (e.g., shading, contour lines, color, etc.) to the objects in accordance with the priority list established at operation 308.

Operation 314 involves updating the internal map 212d with the results of the second and third phase operations, and then re-running the first phase measurements (i.e., repeating operation 302) as indicated by loop back line 316. At operation 318, a detailed object analysis may then be performed of the objects in the internal model 212d. At operation 320 the internal model may be updated with information confirming an identity of one or more of the various objects in the internal model, adding a metadata tag (e.g., information on now known dimensions and/or location in 3D space, etc.) and subsuming more primitive objects or abstracted objects into a new object when these component objects have been positively discerned/identified to make up a single larger object. At operation 322 the updated internal map may be transmitted to the vehicle's autonomous operation algorithm 218. It will be appreciated that operation 322 may be repeated continuously, for example at 10-30 hz as is typical for autonomous algorithms, or whenever required by the algorithm, as the method 300 is repeated and continuously updates the internal model 212d with new primitive and abstract objects, and removes existing primitive and abstracted objects from the internal model as the vehicle moves out of range.

Figure 6:
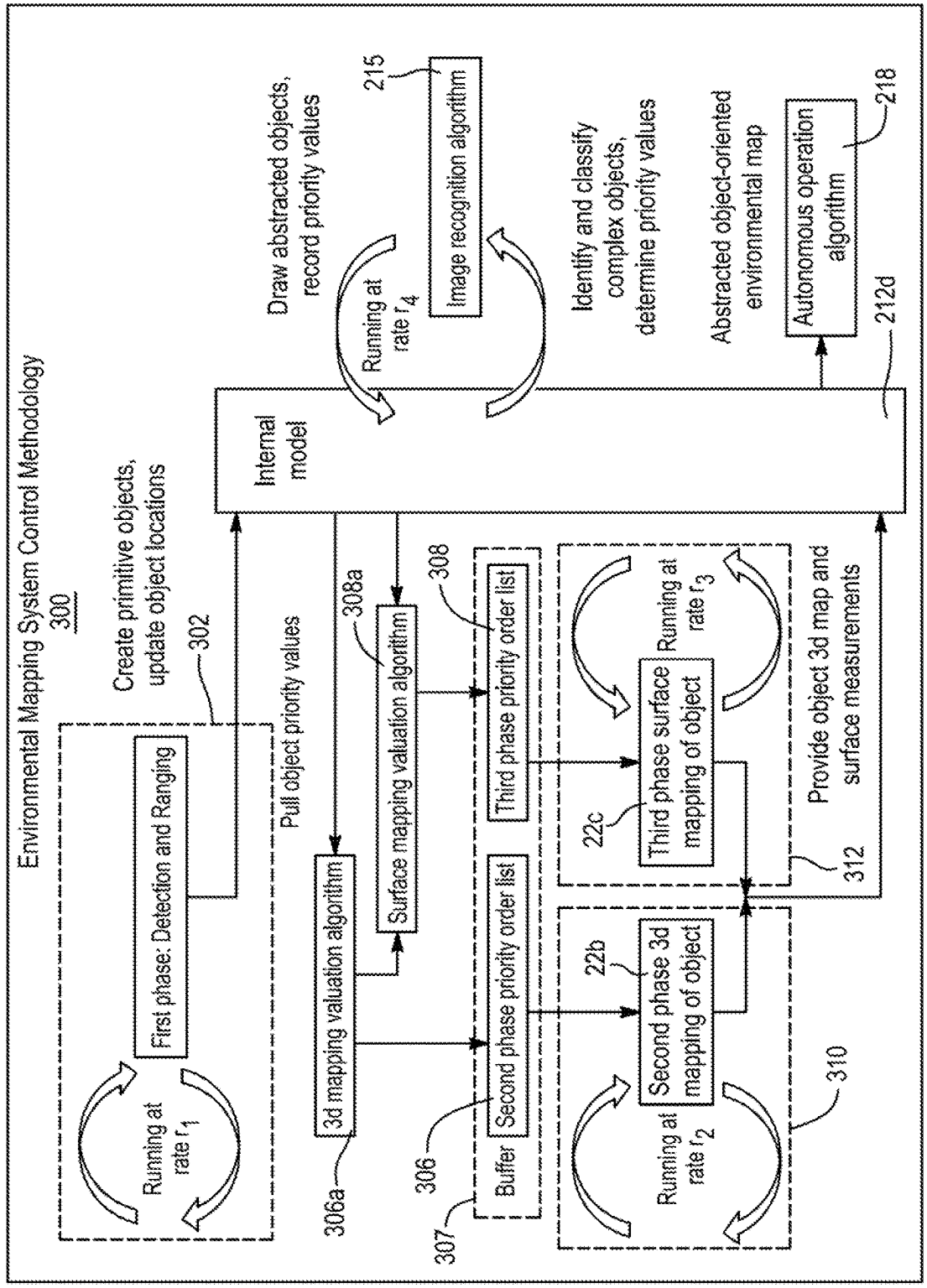
FIG. 6 is a more detailed flow diagram of the operations explained in FIG. 5.

Referring now to FIG. 6, a more detailed diagram is shown to illustrate in even further detail the major operations that have been described in connection with the flowchart 300 of FIG. 5, as well as how the results of these operations are used as inputs and/or outputs to other ones of the subsystems of the mapping system 200. In the first phase 302 employed by the mapping system 200, the detecting and ranging phase is implemented by the detection and ranging subsystem 212a by which the emitter/detector steering subsystem 26 is controlled by the subsystem 212a to generate coarse ranging maps of the surrounding environment or scene. While the detection and ranging subsystem 212a may be used at a set refresh rate, for example to update data collected from the scene every 10-100 ms, a set refresh rate is not mandatory. The refresh rate used in the detection and ranging subsystem 212a may be changed, that is shortened significantly, if the mapping system 200 detects that an emergency situation is present or may be developing. The coarse ranging map is created using low resolution measurements over a wide field of view of the environmental scene being imaged and produces data which is either linked to abstract objects (if it falls within or near the abstracted object volume or noted as primitive objects (if it is unassociated with an abstract object), providing rough approximations of object locations within the field of view being imaged. This data may be reported to the internal model 212d.

In the second phase 310, that is, the identification and intention mapping phase, which is implemented using the IIM subsystem 212b in FIG. 4, adaptive, high spatial resolution sensors, for example those forming the micromirrors within the digital micromirror assembly 32 of FIG. 1, may be used to generate detailed 3D maps of the objects (both primitive and abstract objects), for example by using a suitable 3D mapping algorithm 306a, so that the objects may be identified for further study. For example, the steering subsystem 26 could switch from a rough scan with all the mirrors 34 for a few milliseconds to doing a fine resolution scan with all the mirrors for a few milliseconds. Primitive objects are as yet unabstracted objects in the environment which have not yet been classified. These would be given priority to receive a second phase scan in order to aid in identification, so the image recognition algorithm could provide classification and abstract the object (e.g., tree, road sign, part of house, etc.). Abstracted objects would also receive second phase scans periodically to help understand intent and confirm location (e.g., pedestrian). These maps may be constrained to only measure the targeted objects, thus avoiding wasted data collection. The measurements performed in the second phase 310 are more intensive than those performed in the first phase 302, and thus may be limited to a few objects, or possibly even to only one object, between each first phase refresh. Preferably, as many objects as possible are measured in the second phase 310 using the IIM subsystem 212b before the next first phase measurement occurs.

In the third phase 312, which is the surface mapping phase using the surface mapping subsystem 212c, surface mapping on one or more objects in the internal model 212d may be performed. This may involve initially using a suitable surface mapping valuation algorithm 308a to help generate the third phase priority order list 308. The second phase priority order list 306 and the third phase priority order list 308 may be stored in a common buffer 307, or in separate buffers, or even in the memory 206 (FIG. 4). The surface mapping phase is carried out with 2D image sensors, preferably visible light sensors. The 2d image sensors associated with the surface mapping subsystem 212c which may provide color discernment, may be used to generate detailed surface maps of the objects identified for study, taking into account the color of each object under study. These maps are constrained to just measure the targeted objects, in accordance with the third phase priority order list 308, thus avoiding wasted data collection. The surface maps may be overlaid by the surface mapping subsystem 212c on the 3D maps of the object obtained with the IIM subsystem 212b to create a colored 3d model of the object. As many objects as possible are preferably measured in the third phase before the next first phase measurement occurs.

Primitives Objects and Abstract Objects

Each return in the first phase 302 (i.e., the detecting and ranging phase) is initially considered its own primitive object. These primitive objects correspond to the most primitive shapes, which will typically not be known or understood yet as representing any specific type of known structure (e.g., tree, bicycle, etc.) before they are abstracted into known object classifications, where an "object classification" (or simply "object") represents a known type of item or structure, such as for example a tree, a trash can, a bicycle, etc.). Abstraction describes the process of interpreting primitives and/or other known objects, then bundling them into known objects. Each primitive object is given a 3D location in space in the internal model 212d by the imaging system 212, which is compensated for vehicle motion so as to be in a non-moving frame of reference. By this it is meant that the primitive objects remain stationary within the 3D environmental map being constructed using the internal model 212d. These primitive objects could be, for example, sections of pavement (e.g., roughly segmented by the resolution of the ranging and detection subsystem 212a) or first phase ranging returns corresponding to non-pavement surfaces/objects such as vehicles, pedestrians, road construction cones or barrels, etc. Further measurement of each primitive object is provided by the second and third phase measurement phases 310 and using the IIM subsystem 212b and the surface mapping subsystem 212c, and the object under consideration is further analyzed by an image recognition algorithm 215 operably associated with the internal map 212d. The image recognition algorithms abstract the primitive object by identifying, classifying and grouping one, two or more initially identified primitive objects into more complex shapes. For example, a group of ranging returns from the detection and ranging subsystem 212a which detect two or more primitive objects, but which are inconclusive as to the exact object being indicated, may be given further measurement via the IIM subsystem 212c and the surface mapping subsystem 212c measurement, and be found to correspond to a single tree (i.e., an abstract object, which is a known item or structure) by the image analysis algorithm 215. In another example, the image recognition algorithm 215 may identify the pavement and replace two or more disparate returned primitives with a single pavement object. The newly identified object will be placed into the internal model 212d, subsuming and overwriting the plurality of primitive objects at approximately the same location that were initially written into the internal model. The image recognition system may also aid in subsuming abstracted objects into one or more larger ones, for example recognizing that returns from the two ends of a bus are not separate vehicles but part of one large vehicle.

Further first phase 302 ranging returns provided by the detection and ranging subsystem 212a, which match to existing object volumetric locations to within small variation bounds (set by reasonable or previously measured object velocities), are used to update the location of the object, in case the object has moved slightly from the previous imaging cycle. The velocity of a specific object may also be obtained from filtering the position data over time. High priority objects may be sampled at lower resolution many times, or just continuously as in the noted tracking mode previously, to provide high resolution velocity measurements. Any returns which do not match to existing object locations to within small variation bounds are considered new and are added to the internal model 212d as new primitive objects. If the resulting 2nd and possibly 3rd phase measurements of the new primitive object help the image processing algorithm 215 classify the object as the previously known object, then the object velocity can be modified to match the now recognized step. If the algorithm 215 classifies the object as a new one, then the objects are kept separate in the internal model 212d.

Some detection and ranging technologies can directly measure velocity as well as distance. Velocity data for detection and ranging, as well as previous object location measurements, can be used to predict the location of moving objects in the upcoming round of first phase measurements by the detection and ranging subsystem 212a. The object may be shifted to the predicted location for the upcoming first phase detection and ranging measurement, and adjusted slightly to match the actual measured location of the first phase returns when they are obtained. Each object can be given a metadata label by the image recognition algorithm. This may include, without limitation, the object classification, priority value modifiers and possibly simple kinematically relevant parameters (estimated velocity, acceleration, mass etc.). The kinematics parameters may be used by the image recognition algorithm to generate a simple kinematic model which can be used to cleanly predict future motion. The benefit of the kinematic model is that it filters the noisy position data and provides real time access to the hidden state parameters of the object, e.g., velocity and acceleration, that are of high value to the autonomous driving and operation algorithm 218 (FIG. 4). The autonomous operation algorithm 218 may only need to look at the metadata for the object to identify present best guesses for the state parameters, which would be used to predict potential trajectories for the object.

In a process similar to human perception, the process described above may be used to segment the environmental scene into primitive objects. These primitive objects are successively upgraded into more complex and abstract objects until all ranging returns are corresponding to fully known, identified objects. The process of abstraction starts with primitive objects corresponding to unclassified sensing returns which are then classified into known object types, and grouped until fully abstracted to a known object. The goal of the sensing technique is to reach this level of abstraction for every ranging return, so the environment is fully segmented into abstracted objects. Such fully complete abstraction is only possible with no changes in the environment. Any changes in the environment such as moving objects, changing objects or new sections of environment coming into view are met with the same sensor approach until the new features are fully abstractly classified and included in the internal model 212d.

Valuation

After each first phase 302 refresh, valuation algorithms (306a and 308a) choose where to distribute the focus of the second phase 310 and third phase 310 sensing operations among the objects in the internal model 212d. The order of measurement for the second and third phase measurements, which are contained in the priority lists 306 and 308, are both updated after each first phase refresh. This allows the second phase 310 and third phase 312 measurements to operate out of sync from the first phase 302 refresh rate. The priority order lists 306 and 308 act as a buffer to decouple the first phase 302 measurement from the second phase measurement 310 and the third phase 312 surface mapping operation.

One possible general instantiation for the prioritization algorithms which produce priority lists 306 and 308 would be to generate a value for each object in the field of view and distribute the second phase 310 and third phase 312 detailed mapping sensing to the highest value objects at any time. After measuring the object, the object priority would be reset to zero. The value of each object could be set to grow at a certain rate (in time or per frame) to encourage the algorithm to get around to measuring it again periodically. Unknown objects in the internal map would be given a high priority value. For instance, new sections of road at the edge of the measuring range would correspond to new primitive objects and merit high priority value. The image recognition algorithm 215 may bias the priorities by using the identification of the object to adjust the rating. For instance, once first phase 302 returns are positively identified as objects, these objects may be placed in the internal model 212d (i.e., a stationary map), and given a classification. Objects rated as trees or pavement may be given very low priority value growth to ensure they are not re-measured often, while objects rated as pedestrians or vehicles would have their priority value grown at a very high rate. The net result is to distribute the attention of the second phase 310 and third phase 312 measurement to where they are most valuable.

Separate ranking algorithms 306a and 308a would generally be run for the second phase 310 and third 312 phase measurements, as certain objects like stop lights merit rapid surface image capture but do not merit repetitive 3d mapping. Pedestrians on the other hand preferably would merit rapid 3D mapping but would not require repetitive surface image capture. The third phase 312 surface mapping measurements may generally be only carried out on objects that have already received second phase measurements.

Order of Operations

An example order of operations is provided in the following list for a sensor that is started from the off state.

1) Carry out first phase detection and ranging measurement;

2) Generate internal map using the detection and ranging results in the first phase 302, where each return is its own primitive object;

3) Run the valuation algorithm 306a based on the internal model 212d to generate priority values for second phase 310 and the third phase 312 measurements;

4) Compile a priority order list of objects (operation 306) to measure with the second phase 310 and the third phase 312 measurements;

5) Start the process of 2nd and 3rd phase measurements, going down the list in order of priority;

6) The object should have been measured by the second phase 310 and the third phase 312 mapping in order to have a third phase surface mapped onto it, so at the start the second and third phase measurements would generally go in synchrony through objects;

7) Store the second phase 310 and third phase 312 measurements in the internal model 212d, with each measurement retaining the labeling of the primitive object it was measuring;

8) Continue with the second phase 310 and the third phase 312 measurements down the existing priority lists 306 and 308 until the priority lists are updated by new first phase 302 detection and ranging measurements, at which point the new priority lists are used;

9) In parallel to the sensing work, image processing algorithm 215 examines the ever improving internal model 212d, and classifies the primitive objects that have been second phase and third phase mapped;

10) When a classification is confirmed for a primitive object, the new abstracted object is drawn into the internal model 212d, subsuming the more primitive objects which composed it;

11) Priority values for the second phase 310 and the third phase 312 measurement are provided for the primitive objects and abstract objects;

12) Later first phase 302 detection and ranging measurements are applied in the manner described in the object section above to either relocate the object or locate new primitive objects.

An environmental map may typically start as a large number of unknown object measurements (i.e., also termed "returns"), which effectively form a "point cloud". These individual returns are rapidly studied in detail via the second phase 310 and the third phase 312 measurements until classified and replaced by abstracted identified objects (e.g., a road sign, a human, a vehicle, a bicycle, a tree, a road construction pylon or barrel, etc.). These abstracted objects would replace the disconnected returns of 'objects', and further returns matching the location of the object would be considered to be for the now identified abstracted object, falling under the priority valuation for the abstracted object. The mapping system 200 would then be abstracting and classifying multi-sensor fused data into an object-based environmental map (i.e., the internal model 212d), rather than an image.

At the start of an environmental mapping session, when the full environment is unknown, the system 200 may initially likely classify all first phase returns as roughly equal value, and thus necessitate a first round detailed measurement of the surrounding environment. This is equivalent to the system 200 requiring a moment to recognize its surroundings, which would occur during the vehicle 202 startup. Once completed, the second phase 310 and third phase 312 measurements would move back to focusing on high priority objects (high value objects or new objects), thus maximizing the data quality. Vehicle motion would necessarily produce new unclassified 'objects' at the edge of the environmental scene simply due to vehicle translation over the environmental scene covered by the internal model 212d, which once detected and identified would get added to the stationary internal model 212d. This would mean that stationary vehicles would apply the majority of the focus of their second and third phase measurements to objects of interest like other vehicles, while moving vehicles would distribute part of this focus to mapping the new space coming into view for them.

Sensor Types

The proposed environmental mapping system may use, in one example, three classes of sensors: i) ranging sensors with significant environmental penetration, ii) 3d object mapping sensors with high spatial resolution and iii) 2d image capture sensors with color discernment. Each of these classes may be made up of one or more sensors using one or more sensor technologies. For instance, both a radar and an ultrasonic unit, or a radar and an adaptive lidar unit with low resolution mapping capability may be used as ranging sensors to perform the first phase 302 measurements, and their data fused when generating detection and ranging maps in the first phase of measurement.

The first category of sensors is ranging, which is focused on sensors that can provide distance measurement for a particular angular direction from the vehicle 202. These sensors are used for the first phase detection and ranging measurement. These do not have to be extremely high resolution as they act as merely a warning to the system 200 that an object exists, without providing the resolution sufficient to identify the object. It is also desired that the ranging sensors be able to note a return on objects that may be smaller than the sensor resolution. The high resolution requirement is provided by the second phase 310 of measurement via the third object mapping sensors. It is desired that the ranging sensors be of high environmental reliability so they are able to penetrate poor weather and carry out environmental mapping regardless of the state of the environment. For this reason, radar is one preferred technology for ranging at distance, and ultrasonics for close ranging. The maximum range of interest would be out to around 200 m, with a 2-4 meter resolution, which correlates to around 10-20 mrad. This must be sufficient to identify the existence of an object, but need not provide a fine map of the object. Lidar or cameras can be used to supplement the radar, particularly if optimized for a ranging instead of mapping operation.

The second category of sensors is 3D object mapping, which is focused on sensors that can provide refined high spatial resolution 3D point cloud maps of objects at known locations. These sensors may be used for the second phase 3D mapping measurement. These sensors do not need to be of high reliability as they are tasked to map the object, not detect it in a noisy background. The detection requirement is provided by the ranging sensing, so the system 200 knows where to look to carry out the mapping process. Thus the 3D object mapping sensors can be modulated to account for environmental conditions and ensure a mapping signal is received. For instance, with lidar units the sensors can dwell on the known object location until the SNR is raised sufficiently to generate a return. This helps resolve the weakness of lidar units where they fail to detect low reflectivity objects or objects in poor conditions, as the lidar does not bear the burden of detection. The 3D mapping must be of sufficiently fine resolution to enable identification and discerning of intention of the object. The maximum range of interest is approximately 200 m, at which resolution of around 0.01-0.1 m would be desired, which corresponds to about 50-500 urad. Adaptive lidar is one preferred technology for 3D object mapping. Cameras can be used to supplement the adaptive lidar, particularly if optimized for a mapping instead of surface capture operation.

The third category of sensors is 2d image sensors, which is focused on a sensor that can provide color images of surfaces on at close to moderate (up to perhaps 50-100 m) range. These sensors are used may be used for the third phase surface mapping measurement. These sensors do not need to be of high reliability or have high depth perception capabilities as they are tasked to capture the object surfaces, not detect it in a noisy background or determine range. The detection requirement is provided by the ranging sensing, so the system 200 knows where to look to carry out the mapping process. The 3D mapping requirement is provided by the 3D mapping sensors, so the system has a virtual object shape upon which to map the measured surfaces. Color and other surface features are of critical importance for autonomous driving. For example, lane markings, signs, and stop lights all require color information for correct interpretation. Visible light sensors with the ability to focus on certain areas in the field of view are ideal for the third category. This is achievable with adaptable imaging, where the sensor field of view (FOV) is adjusted by a rapid scanning mirror. Cameras are the preferred technology for visible light sensors.

Multi Capability Sensors

Certain types of sensing technologies may be used in multiple categories of sensing. For example, cameras configured in different forms may be able to provide ranging and 3D mapping in certain scenarios such as close range and good illumination conditions. Adaptive lidar can be shifted between modes corresponding to the first and second category. Adaptive lidar may also be operated in a low resolution mode where the beam spread is wide to carry out detection. It may then be shifted to a coherent emission mode across extended portions of the aperture to generate high resolution 3D object maps.

Benefits

The system 200 several significant benefits. For one, the system 200 builds on a peak benefit of each technology, using each to buttress weaknesses of others. It is able to provide the best possible detection capability, and deliver the best possible, fine resolution 3D mapping capability to support the object detection. This fine resolution 3D mapping is able to work in poor conditions that would cause failure in single mode sensors, such as mapping low reflectivity objects or working in poor environmental conditions. Thus the system 200 outperforms each sensor alone.

The proposed phases of measurement intelligently fuse the data from the multiple kinds of sensors in a way that maximizes the quality of the captured data, thus providing a full environmental awareness with only a small fraction of the data rate of the conventional technique of simple data overlap. The phased approach described herein lowers the computational demand on the autonomous driving algorithm 218. Alternately, the more efficient process can be used to drive up the discernment capability (resolution, range, refresh rates) beyond present day systems.

The proposed technology provides a more reliable, robust and higher resolution environmental 3D map than previous single sensor or simple direct data fusion multi sensor techniques. The system 200 distributes sensor data based on the more natural distribution of objects, ensuring that the objects of value in the environment, for example pedestrians, vehicles, etc., are measured at better quality than the objects of low value in the environment, for example trees, pavement, etc. Non-adaptive, non-object-oriented sensing techniques can only reach equivalent measurement quality by driving up sensing rate and resolution. The drawback of such rate and resolution increases is a substantial rise in the data transfer rate and image analysis computational overhead, to the point of slowing down the autonomous driving algorithm or requiring excessive computational resources (e.g., supercomputers). The adaptive object-oriented approach of the system 200 bypasses these limitations.

The system 200 exploits the assumption that optical systems can track faster than objects can move any significant distance, so an object can be measured in detail once, then tracked using simpler, higher speed detection and ranging to understand location without requiring constant detailed remapping. This avoids the data rate and processing time bottleneck imposed by conventional systems which employ constant, detailed remapping for every image. The autonomous operation calculation demand (which drives hardware requirements) and latency (which drives safety) is thus reduced.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A mapping system adapted for detecting objects in an environmental scene, by scanning an environmental scene with propagating energy, and receiving reflected energy back from objects present in the environmental scene, in a prioritized manner, for later use, the system comprising:
    an electronic controller;
    a memory in communication with the electronic controller;
    control software stored in the memory for controlling system operation;
    an imaging subsystem in communication with the electronic controller, the imaging subsystem including:
        a detection and ranging subsystem for initially identifying primitive objects in the environmental scene; and
        an identification and mapping subsystem for prioritizing the primitive objects for further scanning and analysis, and through the further analysis determining one or more of the primitive objects as being abstract objects, where the abstract objects are understood as one or more known types of abstract objects; and
    an environmental model responsive to the detection and ranging subsystem, and to the identification and mapping subsystem, which maintains a real time map of the one or more primitive objects and the one or more known types of abstract objects within the environmental scene, and which updates the real time map with new primitive objects and new abstract objects as repeated scans of the environmental scene are obtained.

2. The system of claim 1, wherein the imaging subsystem further includes a surface mapping subsystem for applying surface mapping to at least one of the primitive objects or the abstract objects.

3. The system of claim 1, wherein the environmental model further includes an image recognition algorithm for assisting in identifying ones of the primitive objects as abstract objects.

4. A mapping system adapted for detecting objects in an environmental scene, by scanning an environmental scene with propagating energy, and receiving reflected energy back from objects present in the environmental scene, in a prioritized manner, for later use, the system comprising:
    a detection and ranging subsystem for using the reflected energy to carry out a first phase operation of imaging the environmental scene at a first degree of granularity, and generating information which is indicative of a presence of one or more objects in the environmental scene;
    an internal model having an image recognition algorithm that receives the information and uses the image recognition algorithm to initially identify a plurality of objects in the environmental scene, with at least one of the identified objects being a primitive object having insufficient detail to enable a positive identification of an exact type thereof, the internal model configured to create an object priority list for prioritizing further scanning of the identified objects; and
    an identification and intention mapping subsystem configured to receive the object priority list, and to carry out a second phase operation using the detection and ranging system to perform an additional scan in accordance with the object priority list, to obtain additional information for each of the identified objects, in accordance with the object priority list, and to report the additional information to the internal model.

5. The system of claim 4, wherein the internal model is further configured to use the additional information to help clarify an exact identity for the primitive object.

6. The system of claim 4, wherein the internal model is further configured to create an environmental map of the environmental scene being imaged with at least a plurality of the identified objects placed in the environment map.

7. The system of claim 4, wherein the internal model is further configured to use the additional information to update other ones of the identified objects with additional data.

8. The system of claim 4, wherein the internal model is configured to generate a surface priority list for surface mapping the identified objects.

9. The system of claim 8, further comprising a surface mapping subsystem configured to receive the surface priority list and to perform a third phase operation of surface mapping of at least one of the identified objects in accordance with the surface priority list, the surface mapping including adding at least one of shading, contour lines or color, to at least one of the identified objects, and wherein the surface mapping subsystem generates an additional surface priority list.

10. The system of claim 9, wherein the surface mapping subsystem includes a surface mapping valuation algorithm for examining the additional surface priority list and determining where to distribute a focus of the detection and ranging subsystem for the third phase operation to be carried out by the surface mapping subsystem.

11. The system of claim 10, wherein the surface mapping subsystem is configured to obtain further surface related information during the third phase operation, and to provide the further surface related information to the internal model, wherein the internal model is configured to update one or more of the identified objects in the environmental map using the further surface related information.

12. The system of claim 4, further comprising a three dimensional (3d) mapping valuation algorithm for determining where to distribute a focus of the detection and ranging subsystem for the second phase operation to be carried out by the identification and intention mapping subsystem.

13. The system of claim 12, wherein new information collected by the identification and intention mapping subsystem is provided to the internal model, and wherein the internal model is configured to update one or more of the identified objects in the environmental map using the new information.

14. The system of claim 13, wherein the internal model is configured to create a new object priority list after updating one or more of the identified objects in the environmental map using the further information, and to provide the new object priority list to the 3d mapping valuation algorithm.

15. The system of claim 14, wherein the internal model is configured to create a new surface priority list after updating the one or more of the identified objects in the environmental map using the further surface related information.

16. The system of claim 14, wherein the internal model includes an output for providing an abstracted object-oriented environmental map to a navigation system of a vehicle, the abstracted object-oriented environmental map including sufficient detail to at least assist a navigation system of a vehicle in navigating the vehicle.

17. A method for detecting and mapping objects in an environmental scene, in a prioritized manner, by scanning the environmental scene with propagated energy and obtaining energy reflected back from objects in the environmental scene, the method comprising:
- using an electronic controller and a LIDAR imaging system to carry out a first phase operation of imaging the environmental scene, using reflected energy from the environmental scene, at a first degree of granularity and generating information which is indicative of a presence of a plurality of objects in the environmental scene;
- using the electronic controller and the LIDAR imaging system to process the information to identify a plurality of objects in the environmental scene, at least one of the identified objects being a primitive object for which insufficient information is present to make a determination as to what the at least one primitive object is;
- using the electronic controller and the LIDAR imaging system to create an object priority list for the identified objects; and
- using the electronic controller and the LIDAR imaging system to carry out a second phase operation of further using propagated energy to again scan identified objects in the environmental scene, in accordance with the object priority list, and using additional reflected energy to obtain additional information for each of the identified objects in the environmental scene, in a prioritized manner.

18. The method of claim 17, further comprising creating a map of the environmental scene and placing the identified objects in the map.

19. The method of claim 17, further comprising updating the identified objects using the additional information, to help identify the least one of the primitive objects in the priority list.

20. The method of claim 17, further comprising generating a surface mapping priority list for surface mapping the identified objects.

21. The method of claim 20, further comprising using the surface mapping priority list to perform a third phase operation of surface mapping of the identified objects in accordance with the surface mapping priority list, the surface mapping including adding at least one of shading, contour lines or color, to the identified objects.

* * * * *